(12) United States Patent
Lataille et al.

(10) Patent No.: US 7,856,532 B2
(45) Date of Patent: Dec. 21, 2010

(54) CACHE LOGIC, DATA PROCESSING APPARATUS INCLUDING CACHE LOGIC, AND A METHOD OF OPERATING CACHE LOGIC

(75) Inventors: Norbert Bernard Eugene Lataille, Le Cannet (FR); Cedric Denis Robert Airaud, Saint Laurent du Var (FR); Philippe Jean-Pierre Raphalen, Valbonne (FR)

(73) Assignee: ARM Limited, Cambridge (GB)

( * ) Notice: Subject to any disclaimer, the term of this patent is extended or adjusted under 35 U.S.C. 154(b) by 397 days.

(21) Appl. No.: 11/592,320

(22) Filed: Nov. 3, 2006

(65) Prior Publication Data

US 2008/0109606 A1 May 8, 2008

(51) Int. Cl.
*G06F 13/00* (2006.01)
(52) U.S. Cl. .................. 711/133; 711/128; 711/141
(58) Field of Classification Search .............. 711/133, 711/128, 141
See application file for complete search history.

(56) References Cited

U.S. PATENT DOCUMENTS

2001/0029573 A1* 10/2001 Johnson .................. 711/128
2007/0055826 A1* 3/2007 Morton et al. ............ 711/141

* cited by examiner

*Primary Examiner*—Yong Choe
(74) *Attorney, Agent, or Firm*—Nixon & Vanderhye P.C.

(57) ABSTRACT

Cache logic is provided for use in a data processing apparatus, the cache logic having a cache storage comprising a plurality of cache lines for storing data values. Control logic is arranged, in response to an access request issued by a device of the data processing apparatus identifying a memory address of the data value to be accessed, to cause a lookup operation to be performed to determine whether the data value for that memory address is stored within the cache storage. The control logic is further operable if the data value is not stored in the cache storage to perform a linefill process, the linefill process comprising performing an eviction to evict to memory of the data processing apparatus current content of a selected cache line, keeping the current content valid in the selected cache line whilst the eviction is taking place, and storing from the memory into the selected cache line new content including the data value the subject of the access request. Whilst the eviction is taking place, the control logic allows the current content of the selected cache line to be accessed by subsequent read access requests seeking to read a data value within that current content, but prevents the current content of the selected cache line being accessed by subsequent write access requests seeking to write to a data value within that current content.

12 Claims, 7 Drawing Sheets

CACHE LOGIC, DATA PROCESSING APPARATUS INCLUDING CACHE LOGIC, AND A METHOD OF OPERATING CACHE LOGIC

BACKGROUND OF THE INVENTION

1. Field of the Invention

The present invention relates to cache logic for a data processing apparatus, a data processing apparatus including such cache logic, and a method of operating the cache logic.

2. Description of the Prior Art

A data processing apparatus will typically include one or more data processing units which are operable to perform data processing operations on data values stored in memory. Since accesses to memory are relatively slow, and hence are likely to adversely impact the performance of the processing unit, it is known to provide one or more caches within the data processing apparatus for storing a subset of the data values so that they can be made available to the processing unit more quickly than if instead they had to be accessed directly from memory.

When a processing unit wishes to access a data value, it will typically issue an access request specifying an address in memory of the data value required to be accessed. A cache receiving that access request will typically be arranged to determine from the specified address, or at least from a portion thereof, whether the data value the subject of the access request is stored within one of the cache lines of the cache (this being referred to as a hit condition), and if so to allow the data value to be accessed in the cache. For a write access, this will involve updating the relevant data value within the identified cache line, whereas for a read access this will involve returning to the processing unit the data value as read from the identified cache line.

Some regions of memory can be specified as write through regions, and if a write access request is issued in respect of a data value within a write through region of memory, and that data value is found to exist within the cache, the data value is updated in the cache and at the same time is updated in memory, as a result of which the contents in the cache remain coherent with the contents in memory.

However, it is also possible to specify regions of memory as write back regions, and in the event of a write access request being issued in respect of a data value within a write back region of memory, if that data value is found within the cache, it is updated within the cache without the need at the same time to propagate the update to memory. Instead, typically the cache line containing that updated data value is marked as dirty, so that the updated data value can be stored to memory if that cache line is subsequently evicted from the cache.

If on receipt of an access request, the cache determines that the data value the subject of the access request is not present in the cache (referred to as a miss condition), then the cache may be arranged to perform a linefill operation in order to retrieve into the cache a cache line's worth of data from memory, including the data value the subject of the access request, so that the data value can then be accessed directly from the cache. As part of such a linefill procedure, it will typically be necessary to select a cache line to be evicted from the cache in order to make space for the new content being retrieved from memory. There are many known replacement policies for deciding on a suitable cache line to evict and once a cache line is selected as an evicted cache line, its current contents are output to memory and the cache line marked as invalid. Once the current content has been evicted, a linefill can take place, this typically involving a linefill request being issued to external memory, and then when the new content is returned from the external memory, that new content is written to the evicted cache line and the cache line is marked as valid.

There is often a significant period of time between output of the current content of an evicted line and the marking of that evicted cache line as invalid, and the availability of the new content for storing in that evicted cache line.

During that period of time, it is not unusual to observe the processing unit issuing a subsequent access request seeking to access a data value within the current content of the evicted line. However, when evicting the current content, the cache line was marked as invalid, and accordingly it is not possible for the processing unit to access that cache line. Instead, the processing unit has to wait until the eviction of the current content of the evicted cache line has finished (i.e. the memory has successfully received and stored that content), and thereafter needs to initiate a new linefill operation in order to obtain that data back from memory.

This can give rise to a significant impact on performance.

SUMMARY OF THE INVENTION

Viewed from a first aspect, the present invention provides cache logic for use in a data processing apparatus, the cache logic comprising: a cache storage comprising a plurality of cache lines operable to store data values; control logic operable, in response to an access request issued by a device of the data processing apparatus identifying a memory address of a data value to be accessed, to cause a lookup operation to be performed to determine whether the data value for that memory address is stored within the cache storage; the control logic being further operable if the data value is not stored in the cache storage to perform a linefill process, the linefill process comprising performing an eviction to evict to memory of the data processing apparatus current content of a selected cache line, keeping the current content valid in the selected cache line whilst the eviction is taking place, and storing from the memory into the selected cache line new content including the data value the subject of the access request; whilst the eviction is taking place, the control logic being operable to allow the current content of the selected cache line to be accessed by subsequent access requests seeking to read a data value within that current content, but to prevent the current content of the selected cache line being accessed by subsequent access requests seeking to write a data value within that current content.

In accordance with the present invention, the cache control logic is operable during a linefill process to evict to memory the current contents of a selected cache line, but to keep those current contents valid in the selected cache line whilst the eviction is taking place. Further, whilst the eviction is taking place, the control logic can allow the current content of the selected cache line to be accessed by any read access requests seeking to read a data value within that current content, but is arranged to ensure that the current content of the selected cache line is not accessed by any write access requests whilst the eviction is taking place.

By delaying the invalidation of the current content of the selected cache line, subsequent read accesses can in the intervening period continue to hit in the cache, allowing those read accesses to proceed without delay. Further, by adopting such an approach, non-atomic read and write accesses to the cache storage can be avoided when performing the eviction, since there is no need following the lookup operation that resulted in a cache miss (which would have involved a read access into the cache storage, for example to compare at least a portion of the memory address identified in the access request with the address portion values associated with one or more of the cache lines in the cache storage) to then subsequently perform a write access to invalidate the content of the cache line selected for eviction. As a result this avoids a potential write after read hazard that would otherwise need to be prevented (for example by locking a particular cache line entry between the lookup operation and the invalidation). Accordingly, the use of the present invention can result in significant performance improvements in systems employing such a cache.

When performing the linefill process, the manner in which the new content for the selected cache line is obtained from memory for storing in the cache can take a variety of forms. However, in one embodiment, the linefill process further comprises issuing a linefill request to the memory to obtain the new content, and the current content is kept valid in the selected cache line until the new content is available for storing in the selected cache line, even if the eviction has been completed. Accordingly, in such embodiments, it is possible to keep the current content of the selected cache line valid even after the eviction has been completed, and accordingly the memory has received and stored that content, thus extending the period of time during which read accesses to that content can continue to hit in the cache. This hence enables even further performance benefits to be realised. In accordance with this embodiment, only when the new content is available for storing in the selected cache line will such read accesses be prevented. Typically this will be as a result of the new content being stored in that selected cache line to overwrite the current content, such that any subsequent lookup operation in respect of such a read access request will result in a cache miss.

The manner in which the eviction is performed by the control logic can take a variety of forms. For example, the control logic may be arranged to cause the current content for a selected cache line to be output directly to memory. However, in one embodiment, the cache logic further comprises: an eviction buffer operable to receive the current content of the selected cache line and to output that current content to the memory, and the control logic is operable to keep the current content valid in the selected cache line at least until after that current content has been output from the eviction buffer to memory.

In one embodiment, the cache logic further comprises: a linefill buffer operable to receive the new content from the memory prior to that new content being stored in the selected cache line; and the control logic is operable to keep the current content valid in the selected cache line at least until the new content has been received by the linefill buffer. Accordingly, in this latter embodiment, even after the current content has been output from the eviction buffer, the current content can be kept valid in the selected cache line until the new content is received by the linefill buffer, and is accordingly ready to be stored within the selected cache line.

There are a number of ways in which the control logic can be arranged to prevent the current content of the selected cache line being accessed by write access requests whilst the eviction is taking place. In one embodiment, the control logic comprises write control logic operable to process write access requests, the write control logic being operable to detect if a write access request is attempting to access the selected cache line whilst the linefill process is in progress, and if so to prevent the selected cache line from being accessed. In one embodiment, the write control logic prevents the selected cache line being accessed by causing the lookup operation in respect of that write access request to be stalled until the linefill process has completed. This provides a simple and effective mechanism for preventing any write access to the selected cache line. However, it may stall some write accesses unnecessarily, since it may be the case that if the lookup operation is performed a miss in the cache may occur.

For example, considering an n-way set associative cache, for any particular address issued by an access request, there is one cache line in each way at which the data given by that address may reside (this group of cache lines being referred to as a set). An index is derived from the address (typically by extracting a certain portion of the address) and is used to identify that set of cache lines (one cache line in each way) that can potentially store the data value. In association with each cache line, there will further be stored a tag value which corresponds to another portion of the address, and accordingly having identified the set within the cache using the index, it is then necessary to compare the tag portion of the address with the tag values stored in each of the cache lines in the set. This can result in a hit being detected in one of the cache lines, or alternatively may result in no hits being detected, and accordingly a miss condition occurring. Hence, the fact that a write access request may wish to access the selected cache line will not in itself mean that a hit will necessarily occur and hence stalling the lookup operation until after the linefill process has completed is likely to delay certain write accesses that need not be delayed. Nevertheless, as mentioned earlier, it is a simple and effective mechanism for ensuring that no writing does occur to the current content of the selected cache line whilst the linefill process is being performed.

In an alternative embodiment, the write control logic is operable to prevent the selected cache line being accessed by allowing the lookup operation to be performed but it the data value the subject of that write access request is in the selected cache line, to initiate a linefill process in respect of that write access request instead of allowing the selected cache line to be accessed. Such an approach is slightly more complex than the previously mentioned approach of merely stalling the lookup operation, but can result in improved performance.

In one embodiment, the write control logic is operable to detect if a write access request is attempting to access the selected cache line by comparing an index portion of the memory address identified by that write access request with an index value associated with the selected cache line.

Viewed from a second aspect, the present invention provides a data processing apparatus comprising: a processing unit operable to perform data processing operations requiring access to data values stored in memory; cache logic operable to store a subset of said data values for access by the processing unit, the cache logic comprising: a cache storage comprising a plurality of cache lines operable to store said data values; control logic operable, in response to an access request issued by the processing unit identifying a memory address of a data value to be accessed, to cause a lookup operation to be performed to determine whether the data value for that memory address is stored within the cache storage; the control logic being further operable if the data value is not stored in the cache storage to perform a linefill process, the linefill process comprising performing an eviction to evict to the memory current content of a selected cache line, keeping the current content valid in the selected cache line whilst the eviction is taking place, and storing from the memory into the selected cache line new content including the data value the subject of the access request; whilst the eviction is taking place, the control logic being operable to allow the client content of the selected cache line to be accessed by subsequent access requests seeking to read a data value within that current content, but to prevent the current content of the selected cache line being accessed by subsequent access requests seeking to write a data value within that current content.

The processing unit can take a variety of forms, and hence for example may be a processor core, a digital signal processor (DSP), a hardware accelerator, etc. Indeed in some embodiments, the processing unit may itself include a level of caching, and the cache logic of the present invention may reside at a lower cache level so that in effect the source of the access request is a cache at a higher level.

In one embodiment, the memory comprises one or more hierarchical levels of memory, and the linefill process is performed by the cache logic communicating with the hierarchical level of memory adjacent to the cache logic.

Viewed from a third aspect, the present invention provides a method of operating cache logic used within a data processing apparatus, the method comprising the steps of: storing data values within a cache storage comprising a plurality of cache lines; in response to an access request issued by a device of the data processing apparatus identifying a memory address of a data value to be accessed, performing a lookup operation to determine whether the data value for that memory address is stored within the cache storage; if the data value is not stored in the cache storage, performing a linefill process, the linefill process comprising: (i) performing an eviction to evict to memory of the data processing apparatus current content of a selected cache line; (ii) keeping the current content valid in the selected cache line whilst the eviction is taking place; and (iii) storing from the memory into the selected cache line new content including the data value the subject of the access request; whilst the eviction is taking place, allowing the current content of the selected cache line to be accessed by subsequent access requests seeking to read a data value within that current content, but preventing the current content of the selected cache line being accessed by subsequent access requests seeking to write a data value within that current content.

Viewed from a fourth aspect, the present invention provides cache logic for use in a data processing apparatus, the cache logic comprising: a cache storage means comprising a plurality of cache line means for storing data values; control means, in response to an access request issued by device means of the data processing apparatus identifying a memory address of a data value to be accessed, for causing a lookup operation to be performed to determine whether the data value for that memory address is stored within the cache storage means; if the data value is not stored in the cache storage means, the control means further for performing a linefill process, the linefill process comprising performing an eviction to evict to memory means of the data processing apparatus current content of a selected cache line means, keeping the current content valid in the selected cache line means whilst the eviction is taking place, and storing from the memory means into the selected cache line means new content including the data value the subject of the access request; whilst the eviction is taking place, the control means for allowing the current content of the selected cache line means to be accessed by subsequent access requests seeking to read a data value within that current content, but for preventing the current content of the selected cache line means being accessed by subsequent access requests seeking to write a data value within that current content.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
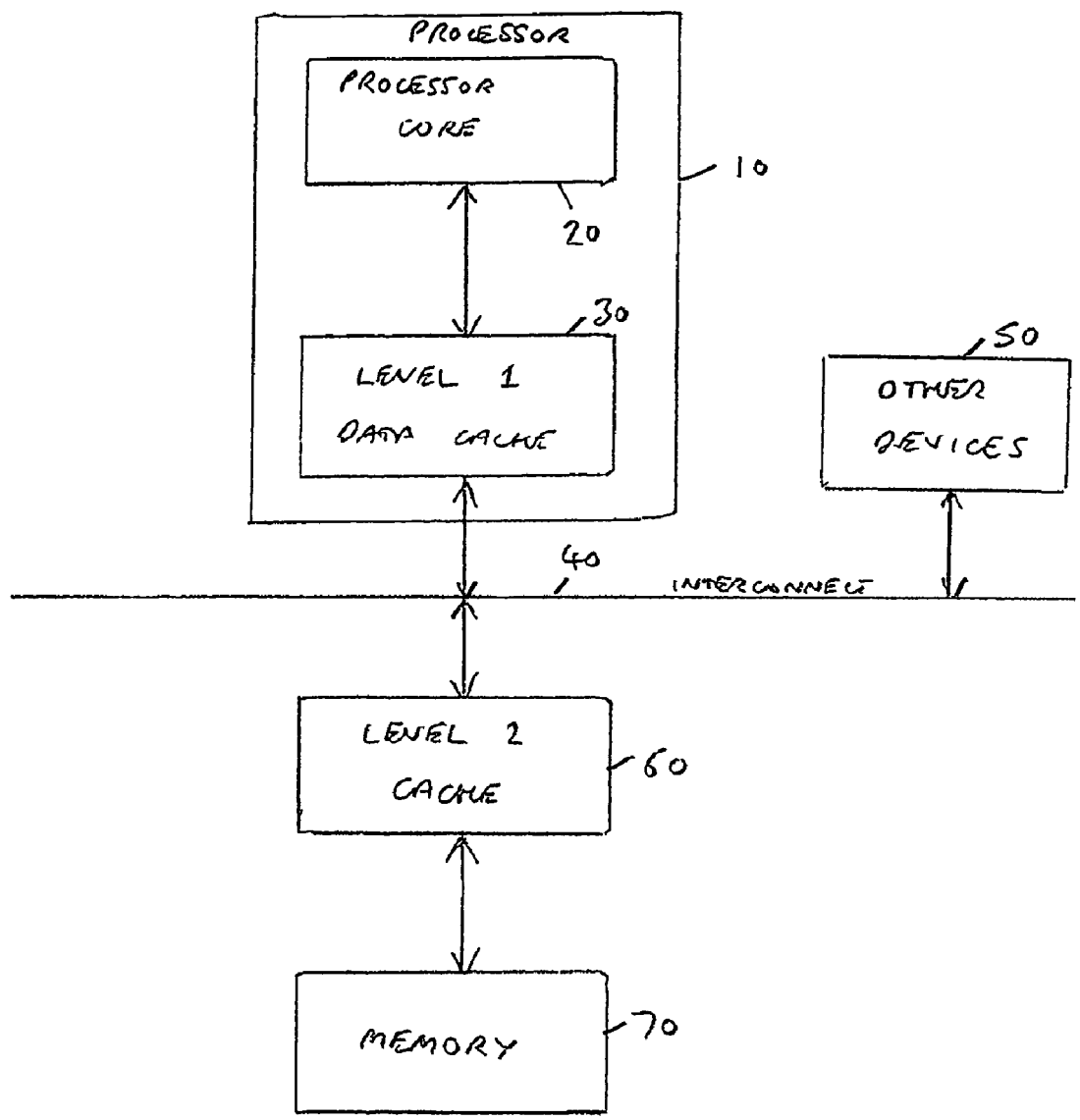
FIG. 1 is a block diagram of a data processing apparatus in accordance with one embodiment of the present invention.

FIG. 1 is a block diagram of a data processing apparatus in accordance with one embodiment of the present invention. As shown in FIG. 1, a processor 10 is provided having a processor core 20 coupled to a level one data cache 30, the data cache 30 being used to store data values for access by the processor core 20 when performing data processing operations. The processor 10 is connected to a bus interconnect 40 via which it can be coupled with other devices 50, and with a memory system, the memory system in this example consisting of a level two cache 60 coupled to memory 70. The other devices 50 can take a variety of forms, and hence can for example be other master devices initiating transactions on the bus interconnect, and/or one or more slave devices used to process transactions issued by master devices on the bus interconnect 40. The processor 10 is an example of a master device, and it will be appreciated that one or more of the other devices 50 may be another processor constructed similarly to processor 10.

When the processor core 20 wishes to access a data value in memory 70, it outputs an access request specifying an address of that data value in memory 70. This access request is received by the level one data cache 30, and assuming the access request pertains to a cacheable region of memory, the level one data cache 30 is arranged to perform a lookup operation in the data cache to determine whether the data value the subject of the access request is present in the cache. If it is, then the data value can be accessed directly in the level one data cache 30 without the need to output a request to memory, thereby significantly saving access time to that data value. Accordingly, if the access request is a read access request, the required data value will be returned from the level one data cache 30 to the processor core 20. If instead the access request is a write access request, then the updated data value output by the processor core 20 can be written into the relevant cache line of the level one data cache 30.

When on performing a lookup operation, it is determined that the data value the subject of the access request is stored within the cache, this is referred to as a cache hit. Conversely, if on performing the lookup operation the data value is not found within the cache, then this is referred to as a cache miss. In the event of a cache miss within the level one data cache 30, the level one data cache will typically output a linefill request to the level two cache 60 via the interconnect 40. This will typically take the form of an access request to the level two cache 60 requesting content from the level two cache 60 sufficient to fill a cache line within the level one data cache, that requested content including the data value initially requested by the processor core 20.

In an analogous manner to that discussed earlier with reference to the level one data cache 30, if the requested content is in the level two cache 60, then it will be returned to the level one data cache 30 (i.e. a hit will occur within the level two cache 60), whereas otherwise a cache miss will be detected, and the level two cache will output a linefill request to memory 70, this linefill request seeking to access data from memory sufficient to fill one of the cache lines in the level two cache, the data requested including the data value initially requested by the processor core 20. Typically, although this is not essential, the cache lines in the level two cache are larger than the cache lines in the level one cache, and accordingly if a hit is detected in the level two cache 60, it will not generally be necessary to output the entire contents of the hit cache line back to the level one data cache 30.

Figure 2:
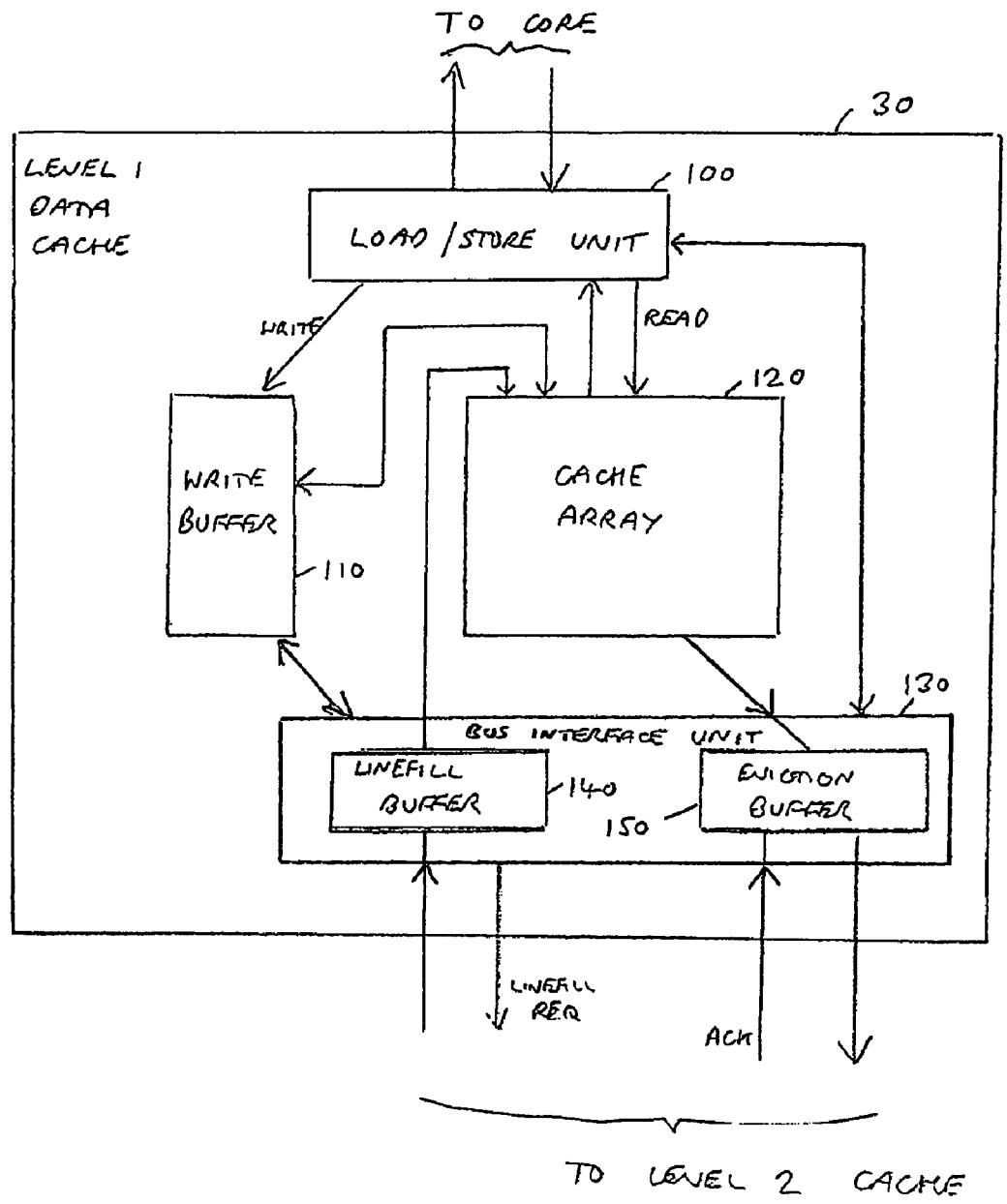
FIG. 2 is a block diagram illustrating logic provided within the level one data cache of FIG. 1 in accordance with one embodiment of the present invention.

FIG. 2 is a block diagram illustrating in more detail the logic provided within the level one data cache 30 of FIG. 1 in accordance with one embodiment of the present invention. As shown in FIG. 2, the cache 30 has a load/store unit (LSU) 100 for interfacing with the processor core, which is arranged to receive read and write access requests from the processor core. For read access requests, a lookup operation is performed within the cache array 120 in order to determine whether the requested data value is in the cache array, and if so that data value is returned via the LSU to the processor core. In the event of a cache miss for a read access request, the LSU 100 is arranged to instruct the bus interface unit 130 to perform a linefill process. To perform the linefill process, a cache line within the cache array 120 is selected as a victim cache line, and its current contents are forwarded to the eviction buffer 150, from where they are output to the level two cache. Subsequently an acknowledgement signal will be received by the eviction buffer 150 confirming that the data output has been stored in the level two cache, whereafter that entry in the eviction buffer can be removed. In addition to performing the eviction, the bus interface unit 130 will also initiate a linefill request to cause a cache line's worth of data forming new content to fill the victim cache line to be retrieved from the level two cache, that retrieved new content being received by the linefill buffer 140 within the bus interface unit 130. Once the new content has been received by the linefill buffer, it is forwarded to the cache array 120 for storing in the victim cache line.

Any write accesses received by the LSU 100 are forwarded to a write buffer 110 which is responsible for handling those write accesses. When a particular write access request is processed by the write buffer, a lookup request can be performed within the cache array 120 in an analogous way to that performed by the LSU 100 for read accesses, and in the event of a hit, the write buffer can output the required data for storing in the relevant cache line of the cache array 120. In the event of a miss, the write buffer 110 will then communicate with the bus interface unit 130 to perform a linefill process, this being analogous to the earlier described linefill process initiated by the LSU 100 in respect of a read miss.

In accordance with a typical prior art linefill process, once a victim cache line has been selected and its content output for storing in the level two cache, that victim cache line is immediately marked as invalid. This ensures that that cache line is not subsequently accessed prior to the linefill process completing. However, it has been found that it is not unusual for the processor core 20 to issue during that intervening period an access request seeking to access current content stored in the victim cache line, and in such situations a cache miss would occur in the cache array, and it would be necessary to wait for the eviction process to finish before instigating a new linefill process in respect of that access request in order to retrieve the required data back into the cache array 120. This can lead to significant inefficiencies in operation of the level one data cache 30.

In accordance with an embodiment of the present invention, invalidation of the victim cache line is delayed, which allows subsequent read access requests seeking to access the current content of the victim cache line to continue to produce hits up until the time that content is overwritten with the new content received in the linefill buffer 140. For write accesses, the write buffer 110 is arranged to ensure that write access requests will not be allowed to proceed in respect of the current contents of the victim cache line even though those current contents are maintained as valid within the cache array 120. The manner in which these above steps are achieved in accordance with one embodiment of the present invention will be described in more detail below with reference to the flow diagrams of FIGS. 3 to 5.

In one embodiment, bolts the eviction buffer 150 and the linefill buffer 140 are arranged to have one entry, and accordingly can store one cache line's worth of data. However, in an alternative embodiment, the eviction buffer 150 may be arranged to store the data from one cache line, but the addresses from more than one cache line. Accordingly, when a particular cache line is sent to the eviction buffer, the data can be output and then discarded from the eviction buffer, whilst the address is kept within the eviction buffer until an acknowledgement is received from the level two cache. Whilst waiting for this acknowledgement, another cache line can be sent to the eviction buffer and sent out to the level two cache. With regard to the linefill buffer, it is possible to replicate the linefill buffer so as to allow more than one linefill to occur at a time. In such instances, the write buffer would refer to the contents of each of the linefill buffers when deciding whether a write access can proceed.

Figure 3:
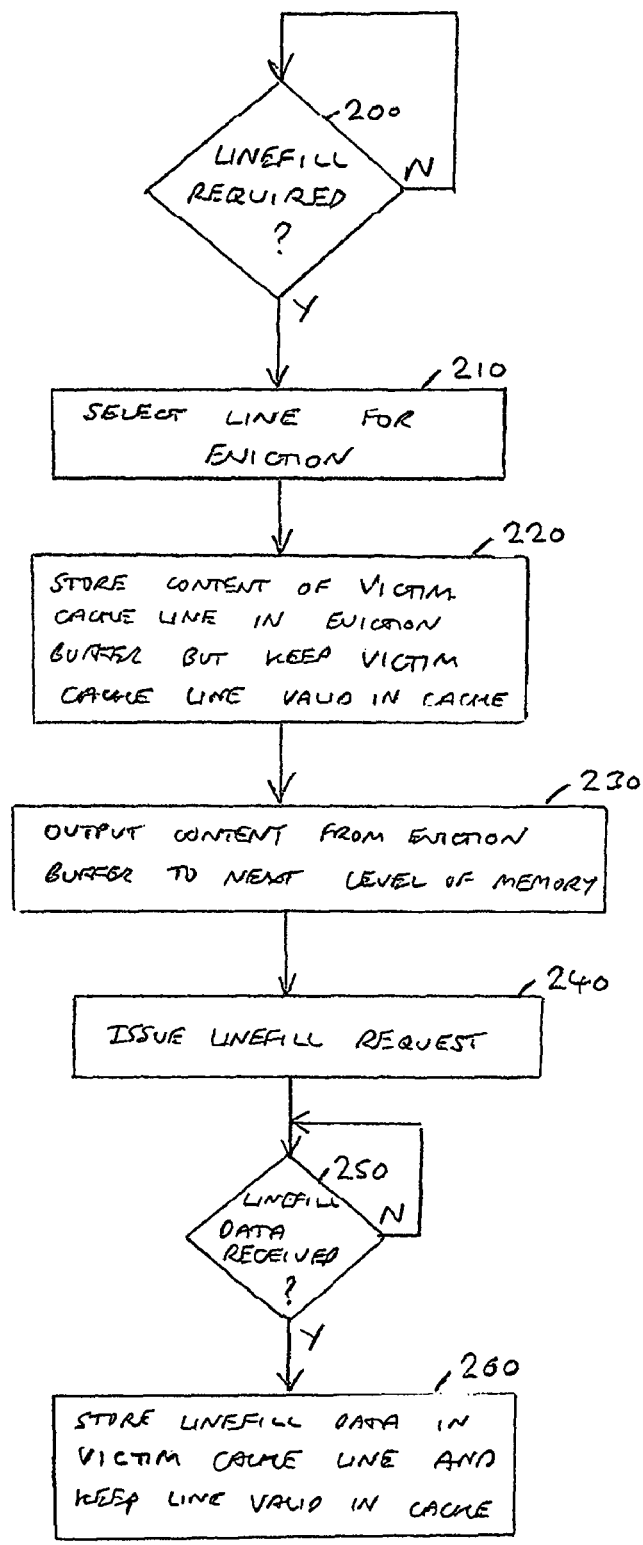
FIG. 3 is a flow diagram illustrating the sequence of steps performed within the level one data cache of FIG. 2 in order to perform a linefill process in accordance with one embodiment of the present invention.

FIG. 3 is a flow diagram illustrating the linefill process performed in accordance with one embodiment of the present invention following a cache miss. At step 200, it is detected whether a linefill is required, and if so the process proceeds to step 210, where a victim cache line is selected for eviction. Any of a number of known techniques for selecting victim cache lines for eviction can be used, for example using a least recently used (LRU)-based replacement policy, a round robin policy, a (pseudo) random replacements policy, etc. Once a victim cache line has been selected, the current content of the victim cache line is output from the cache array 120 to the eviction buffer 150, but in accordance with embodiments of the present invention, the cache array 120 is arranged to keep the victim cache line valid within the cache array 120.

Thereafter, at step 230, the eviction buffer 150 is arranged to output the current content from the eviction buffer to the next level of memory, in this case to the level two cache 60.

Thereafter, at step 240, a linefill request is issued from the bus interface unit 130, whereafter it is determined at step 250 whether the linefill data has been received from the next level of memory, in this instance the level two cache. This can take a variable amount of time, for example because the data requested may or may not be present in the level two cache, and hence may possibly require a further access to memory before the linefill data will be available. However, when subsequently the linefill data is received in the linefill buffer 140, the process proceeds to step 260, where the linefill data is stored in the victim cache line, and the line is kept valid in the cache.

Whilst in FIG. 3, the linefill request is shown as being issued once the content from the eviction buffer has been output to the next level of memory, the exact time at which the linefill request is issued can vary. For example, in some embodiments, the linefill request may not be issued until an acknowledgement has been received from the level two cache to confirm that it has stored the data. However, alternatively, the linefill request could be issued earlier, with the data received into the linefill buffer 140 then being committed to the cache array.

Irrespective of which approach is taken, when the acknowledgement is received from the level two cache, indicating that the level two cache has accepted the evicted data, the index/index+way hazard for writes with respect to the eviction buffer that is used to prevent any access request seeking to write to the cache line whilst the eviction is taking place is removed. In particular, prior to the acknowledgement being received, when processing any write access request seeking to write to the current content of the cache line being evicted, it is noted that the eviction buffer contains the evicted line, and hence the above hazard mechanism prevents the write from proceeding given that a pending eviction is in progress. If the linefill process causes the cache line allocation to take place before the acknowledgement is received, then no hazard exists any more and the write access that would have hit with respect to the evicted cache line will result in a cache miss. If the linefill process causes the cache line allocation to take place after the acknowledgement is received, the above-mentioned index/index+way hazard mechanism prevents any write access request to the evicted cache line taking place in the interim (following receipt of the acknowledgement from the level 2 cache, but prior to cache line allocation, the index/index+way hazard mechanism will apply with respect to the linefill buffer rather than the eviction buffer, so as to prevent a write taking place prior to the linefill completing).

By not invalidating the current content of the victim cache line at the time that current content is sent to the eviction buffer 150, any subsequent read access requests seeking to access a data value within that current content of the victim cache line will still produce a hit within the cache array, until such time as the linefill data has been received, and the linefill data is stored in the victim cache line to overwrite the current content. This can hence present a significant extra period during which read access requests can continue to produce hits within the victim cache line, thereby significantly reducing the access time for those read access requests and also avoiding the need for an additional subsequent linefill operation to be performed to re-retrieve that content to the cache array in order to service such read access requests.

Whilst any read access requests can proceed in the above manner, it is still important to ensure that no write access requests proceed in respect of the current content of the victim cache line since if those write accesses were allowed to proceed, then those updates will subsequently be lost when the linefill process completes and the current content of the victim cache line is overwritten with the linefill data. One way in which the write buffer 110 can be used to ensure that such write accesses do not proceed will be described further with reference to FIG. 4.

Figure 4:
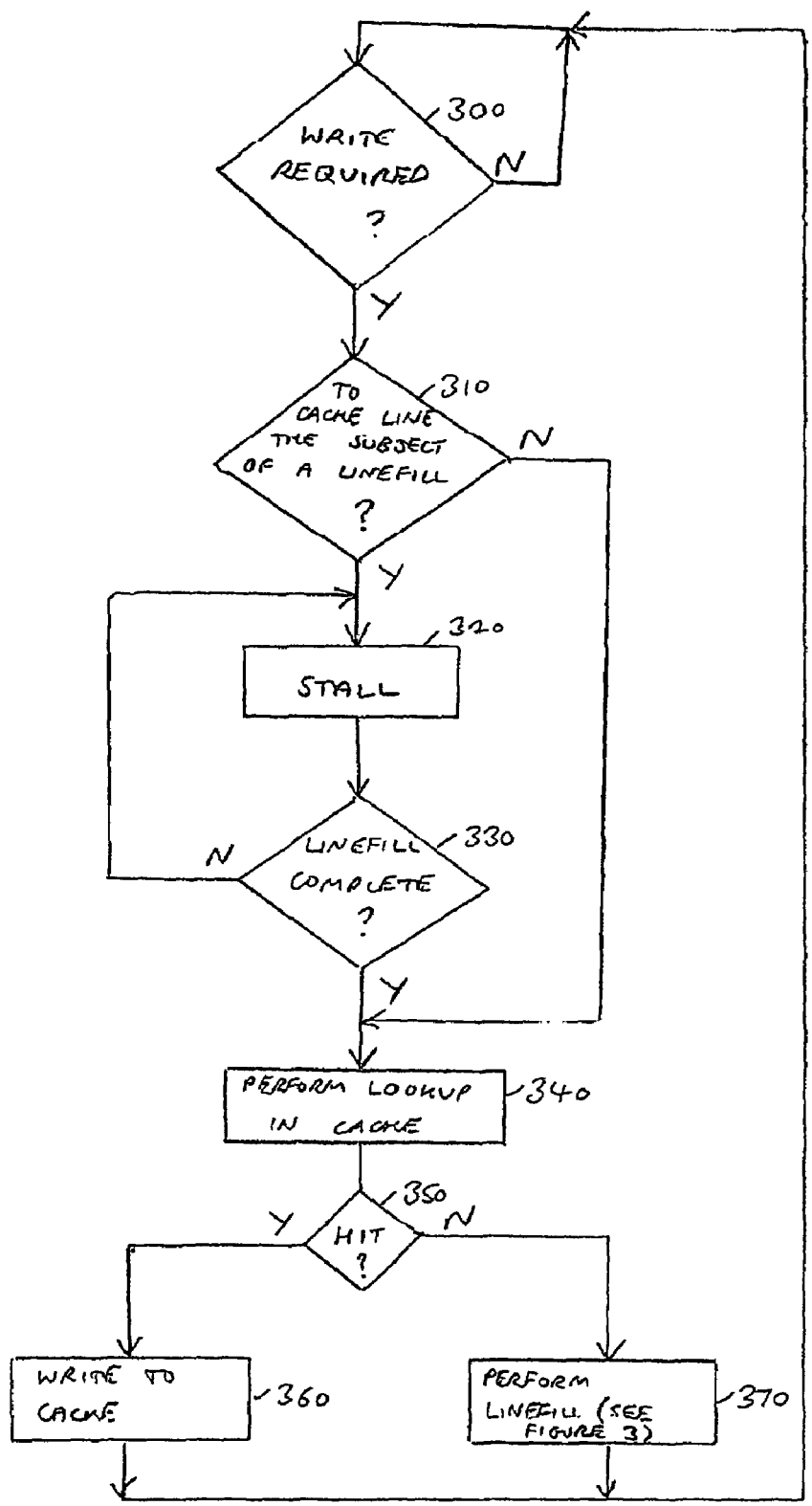
FIG. 4 is a flow diagram illustrating the steps performed by the write buffer logic of FIG. 2 in accordance with one embodiment of the present invention in order to prevent the current content of an evicted cache line being accessed by write access requests whilst an eviction process is being performed.

As shown in FIG. 4, at step 300 the write buffer 110 determines whether a write is required. When a write is required, it is then determined at step 310 whether that write is to a cache line the subject of a linefill. To determine this, the write buffer 110 is arranged to reference the linefill buffer 140 within the bus interface unit 130, which will typically store an index value associated with the cache line being refilled. In a set associative cache, that index value will identify a set of cache lines, the set comprising one cache line in each way, and hence in addition to the index value the linefill buffer will also typically have an indication of the way in which the cache line being subjected to the linefill exists. As mentioned earlier, a write access request will identify a memory address of the data value the subject of the write access request, and an index portion of that address can be extracted to be compared with the index stored in the linefill buffer 140. If the indexes match, then the write buffer 110 will determine at step 310 that the write access is in respect of a cache line the subject of a linefill, and will thereafter proceed to step 320 where the write access is stalled for a predetermined period of time. Thereafter, it is determined at step 330 whether the linefill has completed, i.e. the required linefill data has been received by the linefill buffer 140, and that linefill data has been allocated into the cache line by storing that linefill data in the victim cache line of the cache array 120. If the linefill is determined not to have completed, then the process returns to step 320 where the write request is again delayed for a further period.

When it is determined at stop 330 that the linefill has completed, or if instead at step 310 it was determined that the write access was not to a cache line the subject of a linefill process, then the process proceeds to step 340 where a lookup is performed in the cache. If this lookup operation results in a hit detected at step 350, then the process proceeds to step 360, where the data value is written to the relevant cache line in which the hit occurred. However, if a hit is not detected at step 350, then the process proceeds to step 370, where a linefill process is performed, using the process described earlier with reference to FIG. 3. Following steps 360 or 370, the process then returns to step 300.

From the earlier discussion, it will be noted that at step 310 it is determined that the write access is in respect of a cache line the subject of a linefill if the index value stored in the linefill buffer matches the index portion of the address of the write access in question. This in itself is not sufficient to identify that a hit will necessarily occur if a lookup is performed in the cache, and accordingly by stalling all such write accesses at step 320, it is probable that some accesses will be stalled unnecessarily. However, the scheme illustrated in FIG. 4 provides a relatively simple and robust scheme for ensuring that write accesses do not occur to victim cache lines that are being subjected to a linefill process whilst those victim cache lines are held valid during the linefill process.

In the scheme illustrated in FIG. 4, one write access is handled at a time, and accordingly if a write access is stalled at step 320, no subsequent write accesses in the write buffer are handled. However, it will appreciated that in alternative embodiments the write buffer 110 could be arranged whilst one write access is stalled to begin to process subsequent write accesses that do not involve the cache line being subjected to the linefill process.

Figure 5:
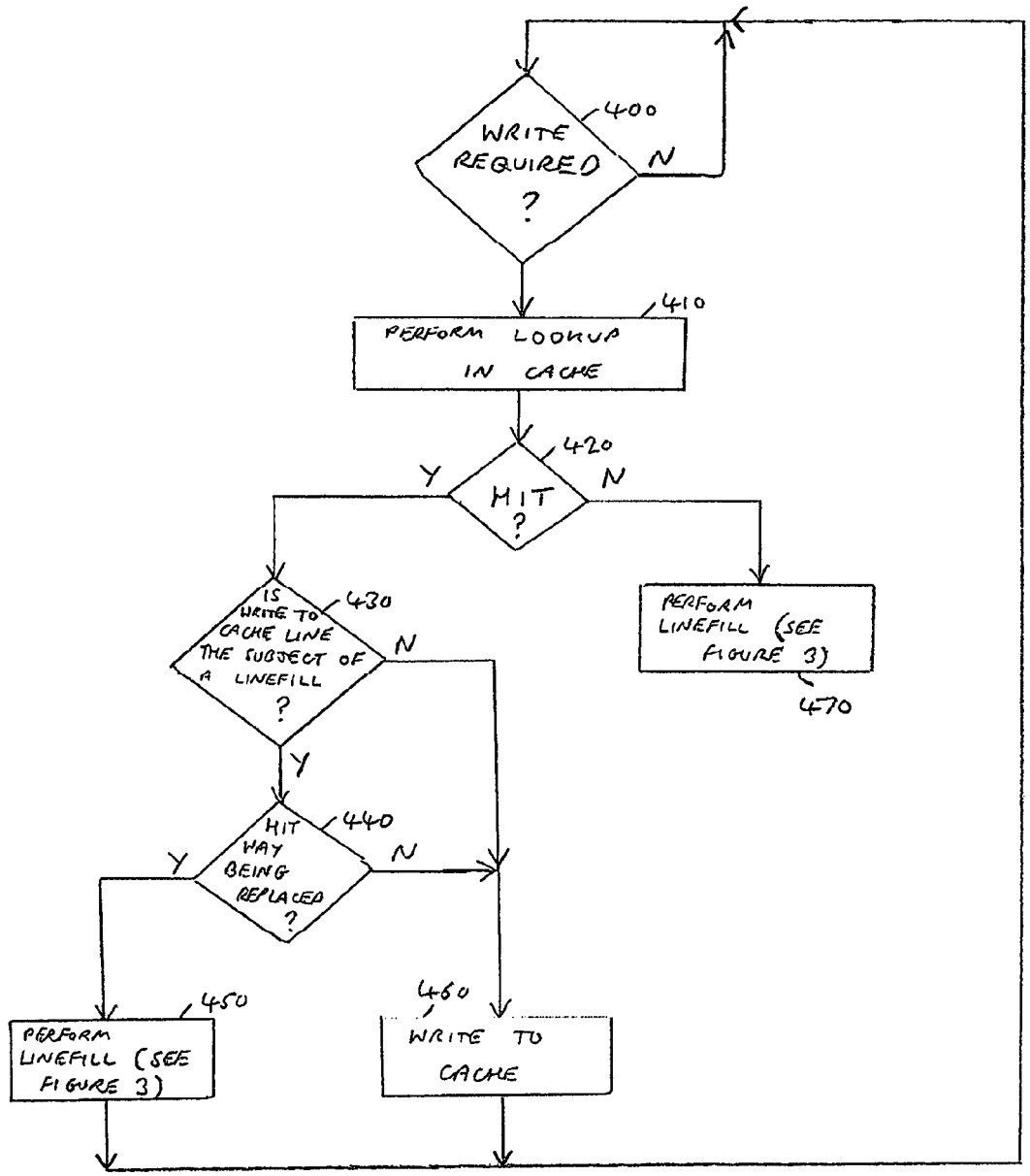
FIG. 5 is a flow diagram illustrating the steps performed by the write buffer logic of FIG. 2 in accordance with an alternative embodiment of the present invention in order to prevent the current content of an evicted cache line being accessed by write access requests whilst the eviction process is being performed.

FIG. 5 illustrates all alternative process to that described earlier with reference to FIG. 4, in which the lookup process is not stalled. As shown in FIG. 5, if it is determined at step 400 that a write is required, then a lookup is performed in the cache array 120 at step 410, whereafter at step 420 it is determined whether a hit has been detected. If not, then the process proceeds to step 470 where a linefill process is performed using the earlier described process of FIG. 3.

However, if a hit is detected, it is then important to decide whether the hit is in respect of a cache line that is being subjected to the linefill process. Accordingly, at step 430 it is determined whether the write is to a cache line the subject of a linefill by comparison of the index stored in the linefill buffer 140 with the index portion of the address, in an analogous manner to that described earlier with reference to step 310 of FIG. 4. If not, then the process proceeds directly to step 460, where the write access proceeds in the cache. However, if it is determined that the write is to a cache line the subject of the linefill, then the process proceeds to step 440 where it actually determined whether the hit way indicated by the hit signal output from the cache array corresponds with the way that is the subject of the linefill request, as mentioned earlier this way information also being stored in the linefill buffer 140. Accordingly, by way of example, for a four way set associative cache, step 430 will identify whether the write access request is proceeding in respect of a set which currently has one of its cache lines being subjected to a linefill process, and step 440 will then determine whether the actual cache line being subjected to the linefill process is also the cache line in which the hit was detected. If not, then it is safe for the write access to proceed, and accordingly the process branches to step 460. However, if the hit way is the way in which the cache line of the set is being subjected to the linefill process, then the write access should not proceed in respect of the contents of the cache line, and instead the process branches to step 450 where a linefill process is performed using the earlier described technique of FIG. 3.

Figure 6:
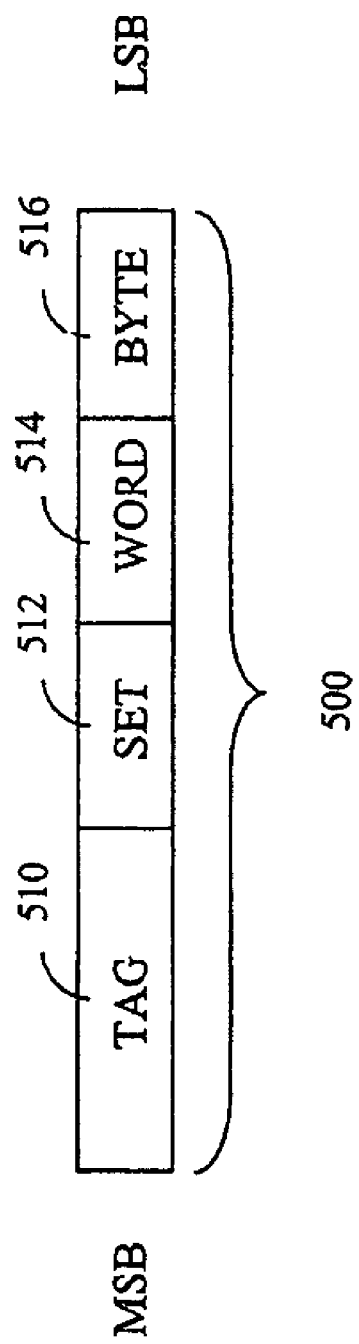
FIG. 6 illustrates the components of an address issued with an access request in accordance with one embodiment of the present invention.

The level one data cache 30 can take a variety of forms. However, in one embodiment, the level one data cache is an n-way set associative cache, for example a four-way set associative cache as illustrated schematically in FIG. 7. FIG. 6 illustrates the contents of an address output by the processor core 20 in association with an access request. The address 500 consists of a tag portion 510, and set, word and byte portions 512, 514, 516, respectively. The set portion 512 of the address 500 is used as an index to identify a particular set within the level one data cache 30. Each of the cache lines in the set will then have stored in a tag array an associated tag value, which is compared with the tag portion 510 of the address 500 in order to detect whether there is a hit in the cache. The word portion 514 identifies a particular word within the cache line that is the subject of the access by the processor core, whilst the byte portion 516 allows a particular byte within the word to be specified if required.

Figure 7:
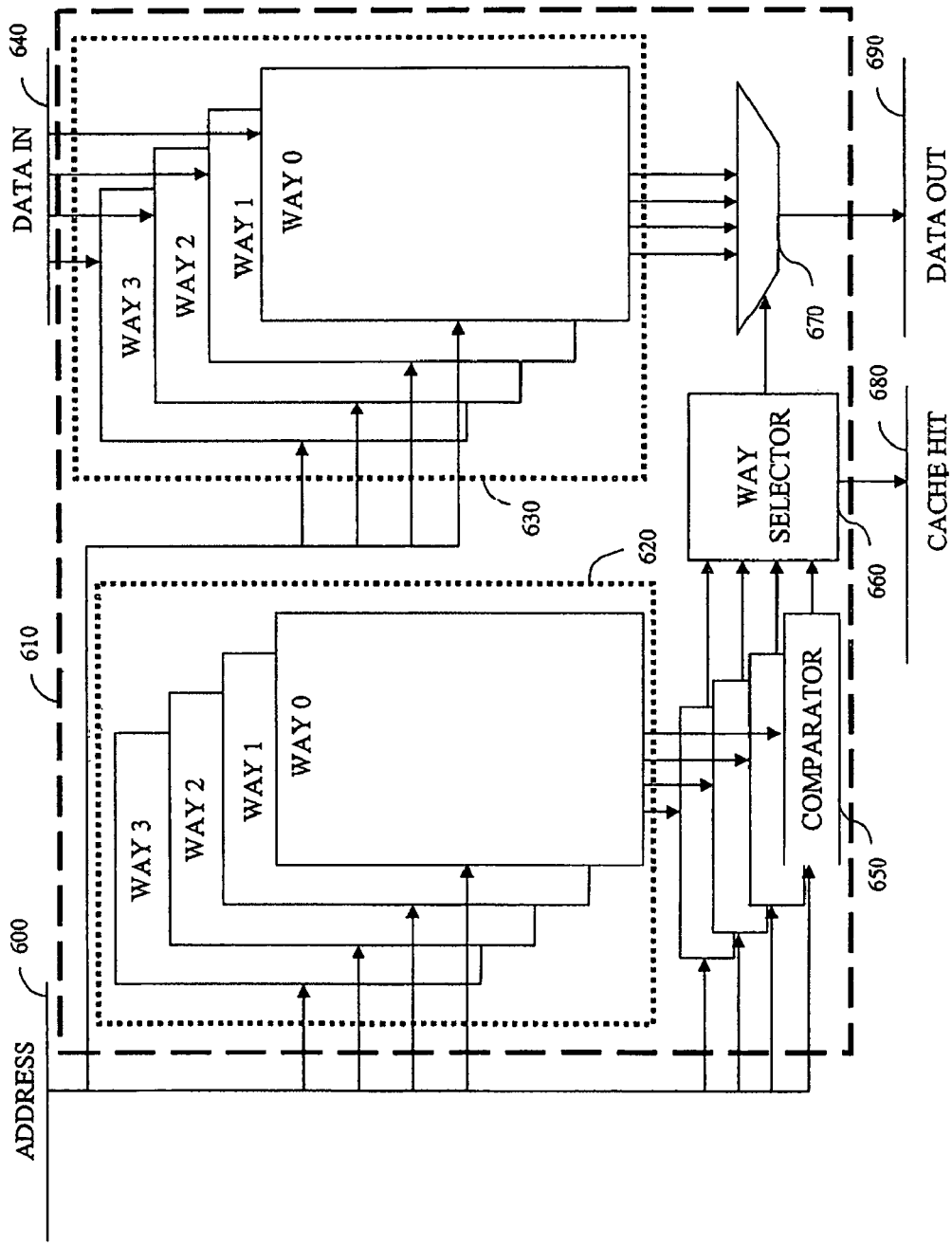
FIG. 7 is a block diagram illustrating components provided within the cache array of FIG. 2 assuming an example of a four way set associative cache.

FIG. 7 illustrates in more detail the operation within the data cache 30 when performing a lookup operation within the cache. The cache comprises of four ways, a comparator 650 associated with each way, a way selector 660 and a multiplexer 670.

A tag RAM 620 is provided containing a tag memory for each way, and similarly a data RAM 630 is provided comprising a data memory for each way. The data memory of each way contains a plurality of cache lines that are arranged to store data values. Each set comprises one cache line in each way. Associated with each cache line is an entry in the associated tag memory in which a tag value is stored.

When a lookup operation is performed, the set portion 512 of the address is routed to each of the tag memories and data memories to identify the cache lines of the relevant set. Within the tag array 620, the tag values for the cache lines identified by the set portion 512 of the address are output to the comparators 650, which also receives the tag portion 510 of the address. Each comparator then compares the tag portion of the address with the tag value received from the corresponding way, and outputs the result of that comparison to the way selector 660. In the event that one of the comparators identifies a match, the way selector outputs a cache hit signal on path 680, this cache hit signal identifying the way in which the hit was detected. In the event that no matches are detected by the comparators, the way selector 660 instead outputs a cache miss signal.

Meanwhile, the set portion of the address 512 as routed to the data RAM 630 causes the relevant cache lines to be accessed within the set. In the event of a read access where a cache hit is detected, the way selector 660 will output a signal to the multiplexer 670 to identify which cache line's data should be output over path 690. The word and byte portions 514, 516 of the address can at this stage be used to identify the particular word or byte to be output.

In the event of a write access which hits in the cache, then if the write access is allowed to proceed (taking into account the operation described previously) then the relevant data can be forwarded to the appropriate way of the data RAM 630 over path 640 for storing in the relevant cache line.

From the above description of embodiments of the present invention, it will be seen that in accordance with the techniques of such embodiments, invalidation of the current content of a victim cache line is delayed, such that whilst the eviction process is being performed, and indeed in one embodiment until the new linefill data has been received and is ready to store in the cache array, the current content in the victim cache line can be kept valid and continue to be referenced by read access requests. However, for write access requests, a mechanism is provided to ensure that those write access requests do not proceed in respect of the current content of the victim cache line, so as to avoid any incorrect operation resulting from the retained validity of the victim cache line's contents. It has been found that there are many situations where it is not unusual to see data in an evicted cache line being requested by the processor core. For example, with caches such as four-way set associative caches, where no LRU-based replacement decision is used to determine a victim cache line for eviction, it is not unusual to see data in the evicted line being requested by the core. By delaying the invalidation, this enables a number of such requests to be handled without the need to issue a new linefill request to re-retrieve that data into the cache array.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. Cache logic for use in a data processing apparatus, the cache logic comprising:
   a cache storage comprising a plurality of cache lines configured to store data values; and
   control logic, in response to an access request issued by a device of the data processing apparatus identifying a memory address of a data value to be accessed, configured to cause a lookup operation to be performed to determine whether the data value for that memory address is stored within the cache storage, the control logic configured, if the data value is not stored in the cache storage, to perform a linefill process, the linefill process comprising performing an eviction to evict to memory of the data processing apparatus current content of a selected cache line, keeping the current content valid in the selected cache line whilst the eviction is taking place, and storing from the memory into the selected cache line new content including the data value the subject of the access request, whilst the eviction is taking place, the control logic configured to allow the current content of the selected cache line to be accessed within the selected cache line by subsequent access requests seeking to read a data value within that current content, but to prevent the current content of the selected cache line being accessed by subsequent access requests seeking to write a data value within that current content, wherein the linefill process further comprises issuing a linefill request to the memory to obtain the new content, and the current content is kept valid in the selected cache line until the new content is available for storing in the selected cache line, even if the eviction has been completed.

2. The cache logic as claimed in claim 1, further comprising:
an eviction buffer configured to receive the current content of the selected cache line and to output that current content to the memory; and
the control logic is configured to keep the current content valid in the selected cache line at least until after that current content has been output from the eviction buffer to memory.

3. The cache logic as claimed in claim 2, further comprising:
a linefill buffer configured to receive the new content from the memory prior to that new content being stored in the selected cache line; and
the control logic is configured to keep the current content valid in the selected cache line at least until the new content has been received by the linefill buffer.

4. The cache logic as claimed in claim 1, wherein the control logic comprises:
write control logic configured to process write access requests, the write control logic configured to detect if a write access request is attempting to access the selected cache line whilst the linefill process is in progress, and if so to prevent the selected cache line from being accessed.

5. The cache logic as claimed in claim 4, wherein the write control logic is configured to prevent the selected cache line being accessed by causing the lookup operation in respect of that write access request to be stalled until the linefill process has completed.

6. The cache logic as claimed in claim 4, wherein the write control logic is configured to prevent the selected cache line being accessed by allowing the lookup operation to be performed but, if the data value the subject of that write access request is in the selected cache line, to initiate a linefill process in respect of that write access request instead of allowing the selected cache line to be accessed.

7. The cache logic as claimed in claim 4, wherein the write control logic is configured to detect if a write access request is attempting to access the selected cache line by comparing an index portion of the memory address identified by that write access request with an index value associated with the selected cache line.

8. A data processing apparatus comprising:
a processing unit configured to perform data processing operations requiring access to data values stored in memory; and
cache logic configured to store a subset of said data values for access by the processing unit, the cache logic comprising:
a cache storage comprising a plurality of cache lines configured to store said data values; and
control logic, in response to an access request issued by the processing unit identifying a memory address of a data value to be accessed, configured to cause a lookup operation to be performed to determine whether the data value for that memory address is stored within the cache storage, the control logic, if the data value is not stored in the cache storage, configured to perform a linefill process, the linefill process comprising performing an eviction to evict to the memory current content of a selected cache line, keeping the current content valid in the selected cache line whilst the eviction is taking place, and storing from the memory into the selected cache line new content including the data value the subject of the access request; whilst the eviction is taking place, the control logic is configured to allow the current content of the selected cache line to be accessed within the selected cache line by subsequent access requests seeking to read a data value within that current content, but to prevent the current content of the selected cache line being accessed by subsequent access requests seeking to write a data value within that current content, wherein the linefill process further comprises issuing a linefill request to the memory to obtain the new content, and the current content is kept valid in the selected cache line until the new content is available for storing in the selected cache line, even if the eviction has been completed.

9. A data processing apparatus as claimed in claim 8, wherein the processing unit is a processor core and the cache logic is a level 1 cache associated with the processor core.

10. A data processing apparatus as claimed in claim 8, wherein the memory comprises one or more hierarchical levels of memory, and the linefill process is performed by the cache logic communicating with the hierarchical level of memory adjacent to the cache logic.

11. A method of operating cache logic used within a data processing apparatus, the method comprising the steps of:
storing data values within a cache storage comprising a plurality of cache lines;
identifying, in response to an access request issued by a device of the data processing apparatus, a memory address of a data value to be accessed, and performing a lookup operation to determine whether the data value for that memory address is stored within the cache storage; and
performing, if the data value is not stored in the cache storage, a linefill process, the linefill process comprising:
performing an eviction to evict to memory of the data processing apparatus current content of a selected cache line;
keeping the current content valid in the selected cache line whilst the eviction is taking place; and storing from the memory into the selected cache line new content including the data value the subject of the access request;

whilst the eviction is taking place, allowing the current content of the selected cache line to be accessed within the selected line cache by subsequent access requests seeking to read a data value within that current content, but preventing the current content of the selected cache line being accessed by subsequent access requests seeking to write a data value within that current content, wherein the linefill process further comprises issuing a linefill request to the memory to obtain the new content, and the current content is kept valid in the selected cache line until the new content is available for storing in the selected cache line, even if the eviction has been completed.

12. Cache logic for use in a data processing apparatus, the cache logic comprising:

a cache storage means comprising a plurality of cache line means for storing data values; and control means, in response to an access request issued by device means of the data processing apparatus identifying a memory address of a data value to be accessed, for causing a lookup operation to be performed to determine whether the data value for that memory address is stored within the cache storage means, and, if the data value is not stored in the cache storage means, for performing a linefill process comprising performing an eviction to evict to memory means of the data processing apparatus current content of a selected cache line means, keeping the current content valid in the selected cache line means whilst the eviction is taking place, and storing from the memory means into the selected cache line means new content including the data value the subject of the access request; whilst the eviction is taking place, the control means for allowing the current content of the selected cache line means to be accessed within the selected cache line by subsequent access requests seeking to read a data value within that current content, but for preventing the current content of the selected cache line means being accessed by subsequent access requests seeking to write a data value within that current content, wherein the linefill process further comprises issuing a linefill request to the memory to obtain the new content, and the current content is kept valid in the selected cache line until the new content is available for storing in the selected cache line, even if the eviction has been completed.

* * * * *